June 1, 1948.  A. D. COGGESHALL ET AL  2,442,587
ELECTRICAL COIL AND METHOD OF MAKING THE SAME
Filed Dec. 28, 1945
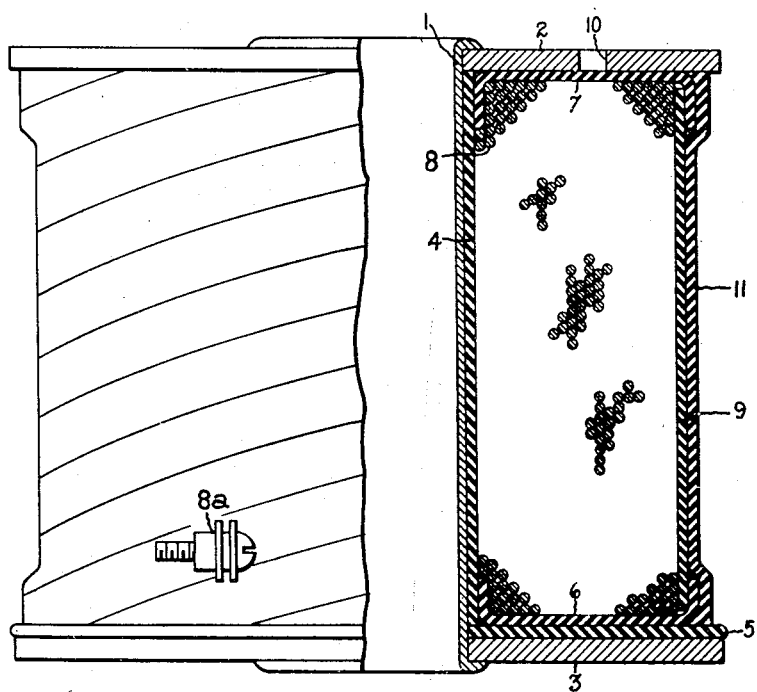
Inventor:
Almy D. Coggeshall,
Bror W. Erikson,
by Claude A. Mott
His Attorney.

Patented June 1, 1948

2,442,587

UNITED STATES PATENT OFFICE 2,442,587

ELECTRICAL COIL AND METHOD OF MAKING THE SAME

Almy D. Coggeshall and Bror W. Erikson, Schenectady, N. Y., assignors to General Electric Company, a corporation of New York Application December 28, 1945, Serial No. 637,674

5 Claims. (Cl. 175—21)

Our invention relates to electrical coils and to new and improved methods of making the same. The invention is particularly applicable to magnet coils in the sizes commonly utilized in control apparatus and the like.

It is a general object of our invention to provide a new and improved coil structure and method of manufacture adapted to quantity production at low cost.

It is a further object of our invention to provide an improved electrical coil which is simple to manufacture and is efficient in operation, particularly at high voltages and high temperatures.

It is still another object of our invention to provide an improved magnet coil having a size small in relation to its rating. Another object of the invention is the provision of an improved impregnation method for magnet coils in which over-all size must be minimized.

Electrical coils have been produced heretofore by impregnating a coil of insulated wire with thermosetting high temperature insulating material, such as a polymerizable solventless fluid resin or the like. Such a coil is of small size relative to its electrical rating. The manufacturing methods heretofore known, however, have been somewhat elaborate and have not been particularly well suited to quantity production of small size coils at low cost. In many instances, molded or other pre-formed varnish impervious containers have been built for retaining the resin in the coil during the baking cycle. Such containers are difficult to manufacture and have resulted in a considerable increase in the over-all coil size and weight.

In accordance with our invention, a smaller coil of equally favorable electrical characteristics is produced without resorting to the costly procedures heretofore known.

According to the invention pliable sheets of varnish impervious material are utilized for the body insulation of the coil itself, and the sheets are formed into a varnish retaining cup which conforms to the shape of the coil itself. The cup is closed at the top by one of the flanges of the spool body and the thermosetting resin is introduced through inlet ports in this flange. The inlet ports themselves serve as reservoirs for retaining a slight excess of fluid resin above the winding, so that the retaining cup need not be any larger than the coil itself.

Our invention will be more fully understood and its various objects and advantages further appreciated by referring now to the following detailed specification taken in conjunction with the accompanying drawing, the single figure of which is a partial sectional view taken along the center line of a magnet coil embodying our invention.

Referring now to the drawing, we have shown a coil comprising a spool formed of a metal tube 1 spun over at each end to retain a pair of annular spool flanges 2 and 3. If desired, of course, the tube 1 may be of other materials, such as fibre, paper, a phenolic insulating material, or the like. The flanges 2 and 3 may be formed of metal, any suitable high temperature phenolic condensation product, high temperature asbestos fiber, varnish impregnated glass fabric, or the like.

Between the flanges 2 and 3, the exterior surface of the spool tube 1 is encased in a varnish absorbent sheet 4 of insulating material, such as paper, glass cloth, or the like. When the flanges 2 and 3 are of metal, it is desirable to place against the inner side of the lower flange 3 a thin washer 5 of any suitable high temperature plastic insulating material. The washer 5 should overhang the flange 3 at the outside edge to provide additional length of the creepage path to ground.

Above the insulating washer 5 there is placed a thin varnish impervious washer 6. The washer 6 has its inner and outer edges upturned to form a varnish retaining cup, and is preferably formed of a thin pliable sheet of varnish impervious deformable material. Various vinyl resin materials are suitable for the washer 6; for example, polyvinyl acetol resin, combined with a suitable plasticizer, may be so used. Adjacent the upper flange there is positioned a porous washer 7 having inturned inner and outer edges. The washer 7 is preferably formed of a varnish absorbent cloth or paper. Glass cloth may be used, if desired.

Upon the spool tube and between the washers 6 and 7 there is a winding 8 of insulated wire. The turns of the winding 8 fill the entire space between the washers 6 and 7 and extend from the spool tube to the region of the outer periphery of the flanges 2 and 3. The winding is formed of wire insulated with enamel, cotton, paper, glass, silk or the like. Preferably, however, we use wire coated with a phenol-aldehyde modified-polyvinyl acetol resin enamel. The wire may be wound either in a random manner or in layers, and, if desired, inter-layer insulation of suitable sheet insulating material may be used. The ends of the wire are brought out to suitable terminals 8a on the outer surface of the coil.

The outer peripheral surface of the winding is covered with an integral sheet 9 of thin pliable varnish impervious material, such as a polyvinyl acetol resin, or the like, combined with a suitable plasticizer. The enclosing sheet 9 is preferably of the same material as the washer 6. The outer edge of the washer 6 is turned up over the lower end of the enclosing sheet 9 and cemented to the sheet 9, so that the washer 6, the metallic spool tube 1 and the sheet 9 together form an annular varnish impervious casing for the winding 8. This varnish retaining toroidal container is closed at the top only by the varnish absorbent washer 7 and the spool flange 2. The flange 2 is provided with one or more apertures 10 to permit the entry of a suitable thermosetting fluid resin, such as solventless varnish or the like, to completely fill the interstices between the wires of the winding 8. In order not to puncture the varnish impervious casing, both ends (not shown) of the winding are brought out to the terminals between the upper washer 7 and the annular sheet 9.

In order to produce a coil which will possess high dielectric strength and low power factor at relatively high operating temperatures and voltages, we use as an impregnant a polymerizable fluid material which does not require the removal of volatile inert solvents during the baking process and which will yield a satisfactory solid heat resistant insulation without the absorption of atmospheric oxygen and without the formation of volatile reaction products, such as water. Although any suitable material or combination of materials which fills this requirement may be employed, we prefer to use polymerizable fluid systems, particularly those having relatively low vapor pressures at the baking temperature and comprising either individual members, or mixtures of a member of one class with a member of one or any member of the other classes of the following types of materials:

I. Unsaturated alkyd resins comprising esters of a polyhydric alcohol, or mixtures of polyhydric alcohols, and an alpha unsaturated alpha beta polycarboxylic acid or a plurality of polycarboxylic acids, one of which, at least, is an alpha unsaturated alpha beta polycarboxylic acid.

II. Esters of unsaturated monohydric alcohols and monobasic or polybasic acids, including alpha unsaturated alpha beta polycarboxylic acids, halogenated aromatic polycarboxylic acids and inorganic acids.

III. Mixed esters of unsaturated monohydric alcohols and the above acids, or mixed esters of the above types of polybasic acids and a plurality of alcohols, one of which, at least, is a monohydric unsaturated alcohol and another a polyhydric alcohol. In the utilization of the foregoing materials a compound acting as an effective polymerization catalyst, usually a peroxide such as benzolyl peroxide, is incorporated in small amounts, say 0.5–5% by weight and the mixture heated at 60–125° C. for an appropriate length of time.

By employing an impregnant of this type and a proper vacuum-pressure technique, it is not only possible to completely fill all void space in the coil, but also, since no solvents have to be expelled, to maintain this condition provided that no or little drainage of impregnant occurs from the coil during the baking process. Such an impregnant for electrical coils is described and claimed in a copending application of Birger W. Nordlander et al., Serial No. 509,366, filed November 8, 1943, and assigned to the same assignee as the instant application.

During the early stage of the baking process, the viscosity of the impregnant is substantially reduced, and any tendency to slight drainage or settling of the fluid at this stage is counteracted by the paper washer 7 and the apertures 10 in the flange 2. During filling of the coil, a slight excess of varnish is left in the apertures 10 above the coil, and these apertures provide sufficient reservoir or storage capacity to ensure that the entire winding 8 remains covered with varnish despite any slight drainage which might occur. Moreover, the washer 7, being formed of a varnish absorbent material, retains varnish at the top of the coil and thereby counteracts any tendency of the varnish to settle during the baking process.

The solventless varnish used is of a type distinguished from currently used treating materials in that a cross-linked polymer is formed by additional polymerization of an unsaturated alkyd and an unsaturated active monomer. During polymerization, a union of the resin and the active monomer occurs with the formation of an essentially insoluble, infusible cross-linked structure. Conversion from liquid to solid takes place with practically no change in volume.

We prefer to finish the coil by wrapping the external surface of the winding with a layer of material providing additional mechanical protection. For this purpose, we have shown an armor layer 11 which, if used, may be formed of any suitable material capable of guarding the coil against mechanical misuse. For the layer 11, we prefer to use glass tape and, for the sake of appearance, the glass tape may be coated with enamel by any well-known dipping or spraying process. The armor layer 11 is also used to hold in place the winding terminals 8a.

With the foregoing understanding of the structure of our new and improved electrical coil, the manner of assembling the coil will now be clear from the following brief description. The spool tube 1 is first spun over at the lower end and the flange 3 and washer 5 assembled in their proper relation. The tube is then wrapped with the paper layer 4 and the deformable varnish impervious washer 6 slipped in place. The paper washer 7 and flange 2 are then placed upon the tube and the tube spun over at the upper end. Next, the winding 8 is wound upon the spool and the varnish impervious sheet 9 wrapped about the outer surface of the winding. The outer edges of the washers 6 and 7 are then turned inwardly over the edges of the sheet 9 and cemented thereto. The coil is then ready for impregnation. If it is desired to wrap the coil with an armor layer 11, the coil may be so wrapped prior to impregnation.

In the impregnation process, the coil is first evacuated for at least one-half hour at 500 microns or less pressure. Following evacuation, the coil is filled with solventless varnish, preferably at a pressure of about 100 pounds per square inch at room temperature. After draining off any excess varnish and cleaning up the coil where necessary, the coil is baked for approximately twelve hours at about 80° C. Upon completion of the baking process, the coil may, if desired, be dipped or sprayed with a suitable enamel or lacquer.

When a varnish absorbent material is used for the armor layer 11 the layer 11 becomes saturated with varnish during the impregnation process. After baking this varnish impregnated armor layer forms a protective casing of great strength and rigidity.

While we have shown and described only a preferred embodiment of our invention, many modifications will occur to those skilled in the art and we therefore wish to have it understood that we intend in the appended claims to cover all such modifications as fall within the true spirit and scope of our invention.

What we claim as new and desire to secure by Letters Patent of the United States is:

1. An electrical coil comprising a spool having upper and lower end flanges, a winding of insulated wire on said spool, a pliable sheet of fluid impervious material encasing the outer peripheral surface of said winding, a pliable fluid impervious washer between said winding and said lower end flange, said washer having an overhanging outer edge turned up over and cemented to said fluid impervious sheet thereby to form a fluid impervious casing for said winding, said upper end flange being apertured to provide an entry port to said casing, and an infusible solid impregnant comprising the product of polymerization of a substantially solventless fluid, said impregnant filling the interstices between the turns of said winding thereby to form an insulated electrical coil substantially free from voids.

2. An electrical coil comprising a spool having upper and lower end flanges, a winding of insulated wire on said spool, a pliable sheet of fluid impervious resinous insulating material encasing the outer peripheral surface of said winding and conforming to the shape of said surface, a pliable washer of fluid impervious resinous insulating material between said winding and said lower end flange, said washer having an annular outer edge turned up over and cemented to said fluid impervious sheet thereby to form a fluid impervious insulated casing for said winding and said upper end flange being apertured to provide an entry port to said casing, and an infusible solid impregnant comprising the product of polymerization of a substantially solventless fluid filling said container and said entry port thereby to impregnate the interstices between the turns of said winding and to provide an excess of said impregnant during its polymerization to solid state.

3. An electrical coil comprising a spool formed of a rigid metallic tube having a pair of end flanges mounted thereon, a sheet of fluid absorbent insulating material encasing the outer peripheral surface of said tube between said flanges, a winding of insulated wire upon said spool, a pliable sheet of fluid impervious material encasing the outer peripheral surface of said winding and conforming to the shape of said surface, a pliable and deformable fluid impervious washer between said winding and one of said end flanges, said washer having inturned inner and outer edges and said outer edge being turned up over and cemented to said fluid impervious sheet thereby to form a fluid impervious casing for said winding, a fluid absorbent washer between said winding and the other of said end flanges, said other end flange being apertured to provide an entry port to said casing, and a solid impregnant comprising the product of polymerization of a substantially solventless fluid filling said container in the interstices between the turns of said winding and filling said entry port thereby to form an insulated electrical coil substantially free from voids.

4. The method of forming an electrical coil which comprises winding a plurality of turns of insulated wire upon a spool, wrapping said winding in a sheet of pliable fluid impervious material leaving an opening defining an entry port for an impregnant, said sheet material being sufficiently deformable to conform closely to the shape of the surface of said coil and forming a container for said impregnant, filling said container with a substantially solventless fluid impregnant polymerizable to form an insulating substantially insoluble solid, and polymerizing said impregnant to form an insulated coil substantially free from voids.

5. The method of forming an insulated electrical coil upon a spool having one end flange apertured which comprises placing a washer of pliable fluid impervious material adjacent the unapertured flange of said spool with its outer edge overhanging said flange, winding a plurality of turns of insulated wire upon said spool between said washer and said apertured flange, wrapping a sheet of pliable fluid impervious material about the outer peripheral surface of said winding, turning the overhanging edge of said impervious washer over said impervious sheet and cementing it thereto to form a fluid impervious casing containing said winding and conforming to the shape of said winding, filling said casing through said apertured end flange with a substantially solventless fluid insulating impregnant which is polymerizable to a solid state, and polymerizing said impregnant within said casing to a solid state.

ALMY D. COGGESHALL.
BROR W. ERIKSON.

REFERENCES CITED

The following references are of record in the file of this patent:

UNITED STATES PATENTS

| Number | Name | Date |
| --- | --- | --- |
| 1,572,869 | Adams | Feb. 16, 1926 |
| 2,116,318 | Miles | May 3, 1938 |
| 2,141,141 | Kongsted | Dec. 20, 1938 |
| 2,181,695 | Given | Nov. 28, 1939 |

FOREIGN PATENTS

| Number | Country | Date |
| --- | --- | --- |
| 285,837 | Great Britain | June 21, 1929 |